United States Patent
Pawar et al.

(10) Patent No.: US 11,842,084 B2
(45) Date of Patent: Dec. 12, 2023

(54) DETECTING AND PERSISTING ACROSS BOOTS TYPES OF BACKING STORAGE OF CLOUD VOLUMES AVAILABLE TO A VIRTUAL STORAGE SYSTEM

(71) Applicant: NetApp, Inc., San Jose, CA (US)

(72) Inventors: Sangramsinh Pandurang Pawar, Bedford, MA (US); Vijay Chandra Hanchatey, Longmeadow, MA (US); Per Olov Wahlstrom, Lexington, MA (US); William Derby Dallas, Merrimack, NH (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/729,891

(22) Filed: Apr. 26, 2022

(65) Prior Publication Data
US 2023/0342089 A1    Oct. 26, 2023

(51) Int. Cl.
*G06F 3/06* (2006.01)
(52) U.S. Cl.
CPC ............ *G06F 3/067* (2013.01); *G06F 3/0604* (2013.01); *G06F 3/0632* (2013.01)
(58) Field of Classification Search
CPC ...... G06F 3/067; G06F 3/0604; G06F 3/0632; G06F 3/0629
See application file for complete search history.

(56) References Cited

U.S. PATENT DOCUMENTS

| | | | | |
|---|---|---|---|---|
| 7,664,839 B1 * | 2/2010 | Karr | .................... | G06F 3/0632 709/227 |
| 11,477,280 B1 * | 10/2022 | Irwin | ..................... | H04L 67/51 |
| 2007/0168609 A1 * | 7/2007 | Ali | ....................... | G06F 3/0605 711/114 |
| 2008/0183989 A1 * | 7/2008 | Liu | ....................... | G06F 3/0605 711/161 |
| 2016/0196090 A1 * | 7/2016 | Gao | ..................... | G06F 3/0632 711/114 |
| 2020/0026425 A1 * | 1/2020 | Memon | .................. | H04L 67/10 |

\* cited by examiner

*Primary Examiner* — Chie Yew
(74) *Attorney, Agent, or Firm* — Jaffery Watson Mendonsa & Hamilton LLP

(57) ABSTRACT

Systems and methods for facilitating performance of data tiering by detecting and persisting types of backing storage of cloud volumes that are available for use by a virtual storage system are provided. In one example, during a boot phase of the virtual storage system within a compute instance of a cloud environment, information regarding a type of backing storage for each of multiple storage devices associated with the compute instance that is not available via hypervisor APIs is obtained via an API exposed by the cloud environment. The multiple storage devices may then be initialized to facilitate subsequent use of a subset thereof in connection with performing data tiering by persisting information indicative of the type of backing storage for the storage device within a reserved header region on each storage device.

20 Claims, 6 Drawing Sheets

DETECTING AND PERSISTING ACROSS BOOTS TYPES OF BACKING STORAGE OF CLOUD VOLUMES AVAILABLE TO A VIRTUAL STORAGE SYSTEM

BACKGROUND

Field

Various embodiments of the present disclosure generally relate to virtual storage systems. In particular, some embodiments relate to an approach for backing storage type detection in cloud environments, for example, to facilitate data tiering by a virtual storage system

Description of the Related Art

Storage systems make use of information regarding disk properties of attached or integrated disks to facilitate performance of data tiering, which generally involves moving less frequently used data, also known as cold data, to cheaper (and typically less performant) levels of storage or tiers while retaining hot data on more expensive (and typically higher performant) levels of storage or tiers. For example, storage systems may create a hybrid aggregate (set of disks) including at least one disk (e.g., a solid-state drive (SSD)) in a performance tier of the hybrid aggregate and at least one disk (e.g., a hard-disk drive (HDD)) in a capacity tier of the hybrid aggregate.

SUMMARY

Systems and methods are described for facilitating performance of data tiering by detecting and persisting types of backing storage of cloud volumes that are available for use by a virtual storage system. According to one embodiment, during a boot phase of a virtual storage system within a compute instance of a cloud environment, information indicative of a type of backing storage for respective storage devices of multiple storage devices associated with the compute instance is obtained by a first process of the virtual storage system via an application programming interface (API) exposed by the cloud environment. The obtained information is caused to be stored by the first process within a cache accessible to a second process of the virtual storage system. Use of at least a subset of the multiple storage devices for performance of data tiering by the virtual storage system is facilitated by for each storage device of the plurality of storage devices: (i) determining whether a header region on the storage device reserved for use by the virtual storage system contains information indicative of the type of backing storage for the storage device; and (ii) responsive to a negative determination, initializing information indicative of the type of backing storage for the storage device within the header region based on the cache and registering the storage device with the virtual storage system.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
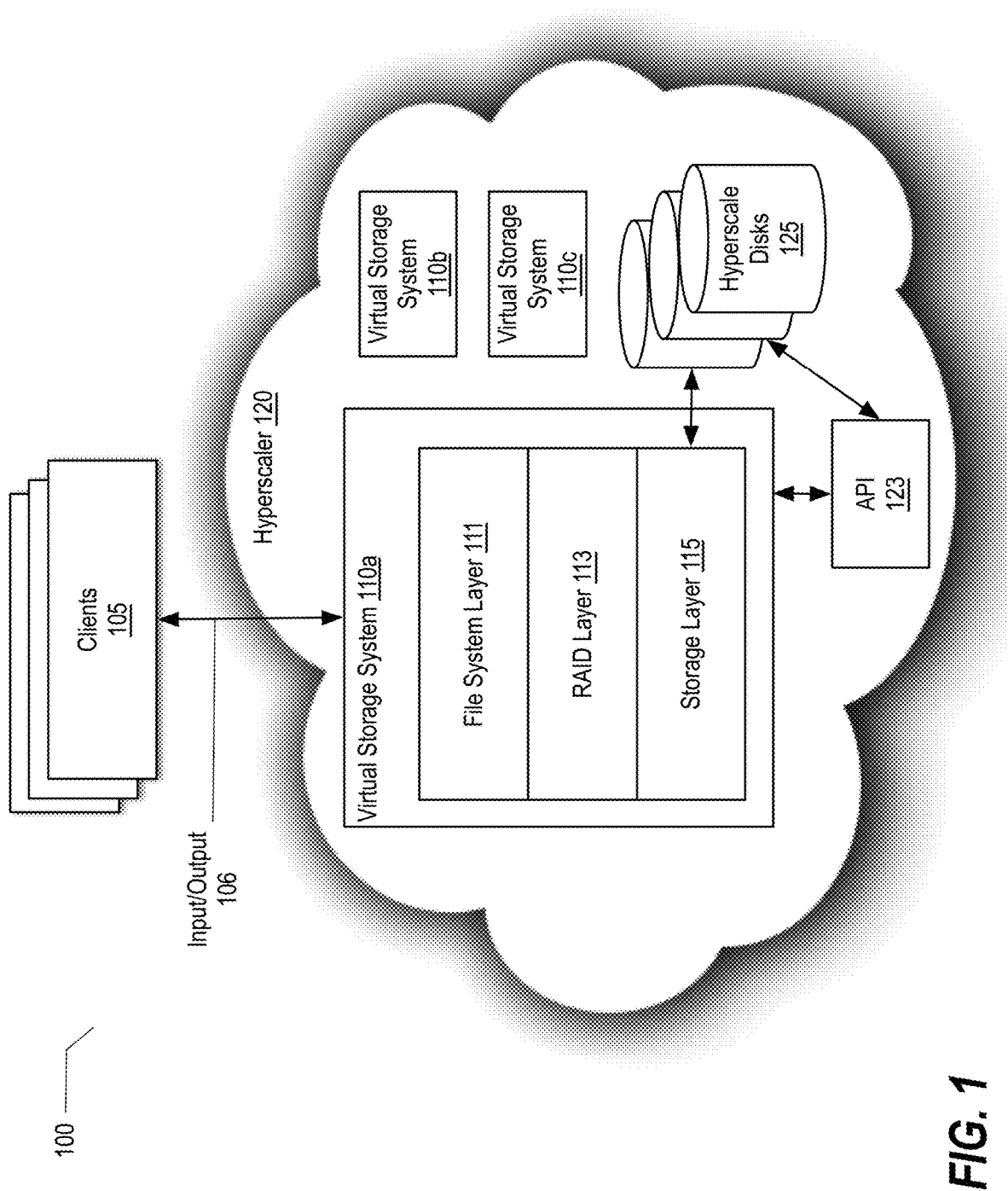
FIG. 1 is a block diagram illustrating an environment in which various embodiments may be implemented.

Systems and methods are described for facilitating performance of data tiering by detecting and persisting types of backing storage of cloud volumes that are available for use by a virtual storage system. Physical storage systems have access to disk properties of attached or integrated disks via the operating system. When a storage system is hosted in a compute instance (e.g., a virtual machine (VM) or a container) of a cloud environment, the storage system may be referred to as a virtual storage system. In cloud environments, information regarding properties of storage devices available for use by the virtual storage system is not available via hypervisor application programming interfaces (APIs). Without the ability to distinguish among various performant types of storage devices early during a boot phase of the virtual storage system, all storage devices are effectively presented to the virtual storage system as generic cloud volumes, thereby precluding the creation of a hybrid aggregate by the virtual storage system that may be used for performance of data tiering.

In order to facilitate performance of data tiering by virtual storage systems, embodiments described herein seek to provide a mechanism to detect and persist across boots information regarding the types of backing storage of cloud volumes. As described further below, in one embodiment, during a boot phase of a virtual storage system within a compute instance of a cloud environment, information indicative of a type of backing storage for respective storage devices of multiple storage devices associated with the compute instance may be obtained by a first process (e.g., a user space process) of the virtual storage system via an application programming interface (API) (e.g., the Amazon Web Services (AWS) Elastic Compute Cloud (EC2) API) exposed by the cloud environment. The first process may further cause the obtained information to be stored within a cache accessible to a second process (e.g., a kernel space process) of the virtual storage system. The second process facilitates use of at least a subset of the multiple storage devices for data tiering by the virtual storage system by for each storage device: determining whether a header region on the storage device reserved for use by the virtual storage system contains information indicative of the type of backing storage for the storage device (persisted during a previous boot of the virtual storage system); and when such information is not present within the header region (indicative of this being an initial boot), then the information indicative of the type of backing storage for the storage device within the header region is initialized based on the cache and the storage device is registered with the virtual storage system.

While in the context of various examples described herein the types of backing storage employed for data tiering may be represented at a coarse level of granularity including an HDD backing storage type and an SSD backing storage type, various other categorizations or groupings of backing storage types may be employed including more granular performant disk categories of backing storage based on different performance characteristics (e.g., one or more of durability, input/output operations per second (IOPS), and/or throughput) of the backing storage. For example, the SSD backing storage type may be further broken out into low performant SSD and high performant SSD.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein a "storage device" or a "hyperscale disk" generally refers to persistent storage that is accessible to a virtual storage system by virtue of the persistent storage being associated with a compute instance in which the virtual storage system is running A storage device may represent an HDD or an SSD from a pool of storage devices within a cloud environment that is connected to the compute instance through Ethernet or fibre channel (FC) switches as is the case for network-attached storage (NAS) or a storage area network (SAN). Non-limiting examples of storage devices include various types of SSD volumes (e.g., AWS Elastic Block Store (EBS) gp2, gp3, io1, and io2 volumes for EC2 instances) and various types of HDD volumes (e.g., AWS EBS st1 and sc1 volumes for EC2 instances) having different performance characteristics in terms of durability, IOPS, and/or throughput.

As used herein a "type of backing storage" generally refers a class, a category, and/or characteristics of the storage media that provides backing for a storage device or hyperscale disk. A type of backing storage may be defined at various levels of granularity depending upon the particular implementation. For example, a course level of granularity (e.g., identifying storage as either HDD backed or SDD backed) may be sufficient for certain applications. Alternatively, a finer level of granularity that distinguishes among various performant levels of HDD backed and/or SSD backed storage devices may be desired. For example, types of backing storage may include multiple categories of HDD-backed storage and/or SSD-backed storage defined in terms of enumerated levels of one or more of durability, IOPS, and/or throughput. In the context of AWS, for example, the set of volume types supported include AWS EC2 gp2, gp3, io1, io2, st1, and sc1, where gp2, gp3, io1, and io2 represent different performant classes of SSD-backed storage and st1 and sc1 represent different performant classes of HDD-backed storage. In one embodiment, the types of backing storage may map directly to the volume types supported by the cloud environment at issue. In other embodiments, a mapping may be used to translate a finer granularity of the volume types supported by the cloud environment to a coarse granularity of backend storage device types supported by a particular virtual storage system.

Example Operating Environment

FIG. 1 is a block diagram illustrating an environment 100 in which various embodiments may be implemented. In various examples described herein, a virtual storage system 110a, which may be considered exemplary of virtual storage systems 110b-c, may be run (e.g., on a VM or as a containerized instance, as the case may be) within a public cloud provided by a public cloud provider (e.g., hyperscaler 120). In the context of the present example, the virtual storage system 110a makes use of storage (e.g., hyperscale disks 125) provided by the hyperscaler, for example, in the form of solid-state drive (SSD) backed or hard-disk drive (HDD) backed disks. The cloud disks (which may also be referred to herein as cloud volumes, storage devices, or simply volumes or storage) may include persistent storage (e.g., disks) and/or ephemeral storage (e.g., disks).

The virtual storage system 110a may present storage over a network to clients 105 using various protocols (e g, small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 105 may request services of the virtual storage system 110 by issuing Input/Output requests 106 (e.g., file system protocol messages (in the form of packets) over the network). A representative client of clients 105 may comprise an application, such as a database application, executing on a computer that "connects" to the virtual storage system 110 over a computer network, such as a point-to-point link, a shared local area network (LAN), a wide area network (WAN), or a virtual private network (VPN) implemented over a public network, such as the Internet.

In the context of the present example, the virtual storage system 110a is shown including a number of layers, including a file system layer 111 and one or more intermediate storage layers (e.g., a RAID layer 113 and a storage layer 115). These layers may represent components of data management software (not shown) of the virtual storage system 110. The file system layer 111 generally defines the basic interfaces and data structures in support of file system operations (e.g., initialization, mounting, unmounting, creating files, creating directories, opening files, writing to files, and reading from files). A non-limiting example of the file system layer 111 is the Write Anywhere File Layout (WAFL) Copy-on-Write file system (which represents a component or layer of ONTAP software available from NetApp, Inc. of San Jose, Calif.).

The RAID layer 113 may be responsible for encapsulating data storage virtualization technology for combining multiple hyperscale disks 125 into RAID groups, for example, for purposes of data redundancy, performance improvement, or both. The storage layer 115 may include storage drivers for interacting with the various types of hyperscale disks 125 supported by the hyperscaler 120. Depending upon the particular implementation the file system layer 111 may persist data to the hyperscale disks 125 using one or both of the RAID layer 113 and the storage layer 115.

Various storage device level operations, including, but not limited to, creating a volume, deleting a volume, attaching a volume to a compute instance, obtaining information regarding a specified volume or all volumes attached to a specific compute instance, may be performed by the virtual storage system 110a via an API (e.g., API 123) exposed by the hyperscaler 120. A non-limiting example of API 123 in the context of AWS is the EC2 API.

The various layers described herein, and the processing described below with reference to the flow diagrams of FIGS. 3 and 4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., servers, blades, network storage systems or appliances, and storage arrays, such as the computer system described with reference to FIG. 6 below.

Example User Space and Kernel Space Components of a Virtual Storage System

Figure 2:
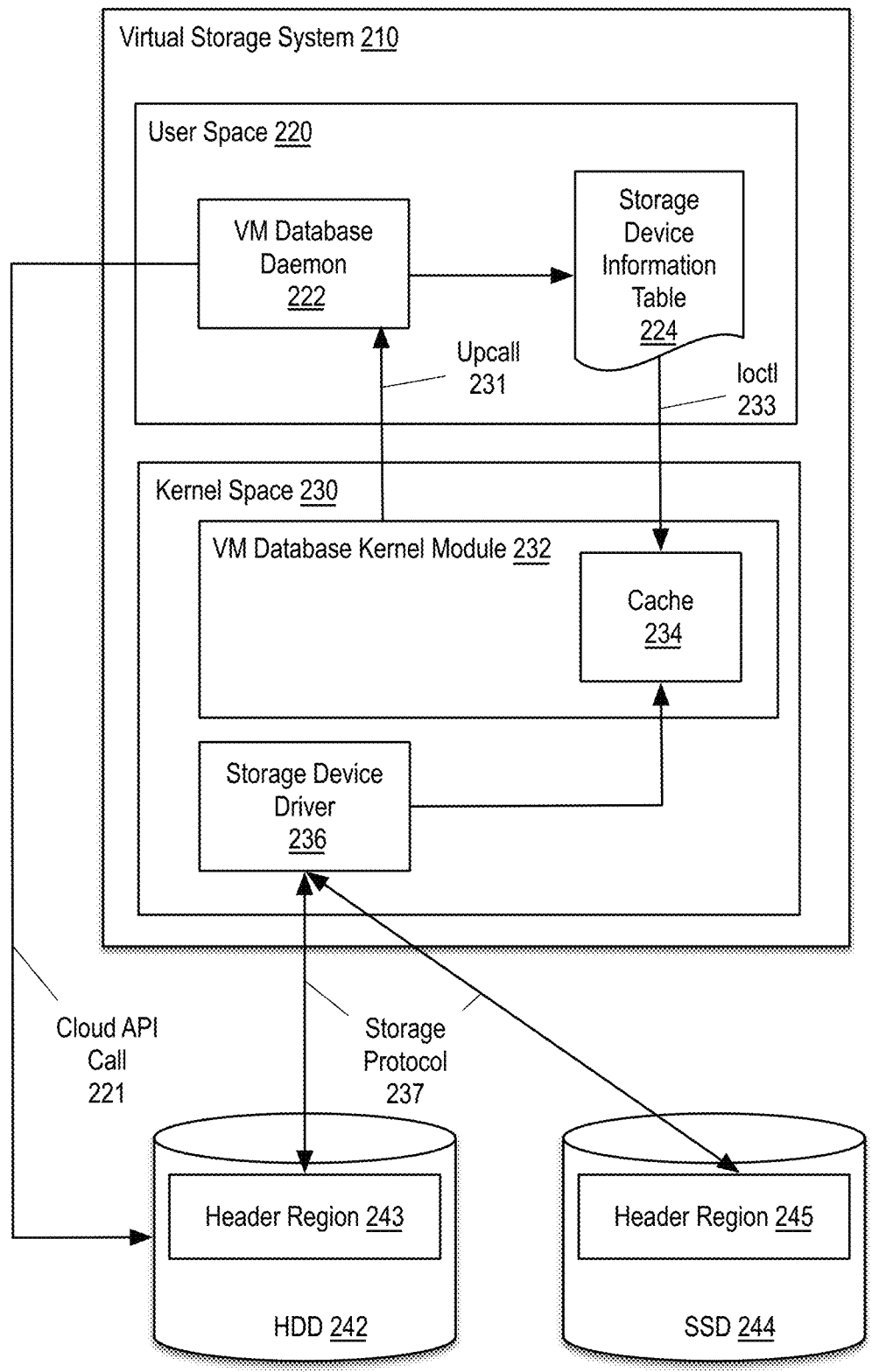
FIG. 2 is a block diagram conceptually illustrating user space and kernel space components of a virtual storage system in accordance with an embodiment of the present disclosure.

FIG. 2 is a block diagram conceptually illustrating user space and kernel space components of a virtual storage system in accordance with an embodiment of the present disclosure. In the context of the present example, a virtual storage system 210 (which may be analogous to virtual storage systems 110a-c) is shown including a user space 220 and a kernel space 230 of a storage operating system hosted within a virtual machine (VM) running within a guest operating system (e.g., FreeBSD) of a host computer system (not shown).

In one embodiment, the user space 220 includes a VM database daemon 222 and a storage device information table 224. The VM database daemon 222 may represent a process that is responsible for discovering or collecting information indicative of a type of backing storage for respective storage devices of multiple storage devices (e.g., HDD 242 and SSD 244, which may be analogous to hyperscale disks 125) associated with the VM. The VM database daemon 222 may make a cloud API call 221 to obtain information regarding the multiple storage devices responsive to a boot phase of the virtual storage system 210 and may also invoke the cloud API 221 responsive to addition of a new storage device, for example, a "hot volume attach" when the virtual storage system 210 is up and healthy and a new storage device is attached to the VM.

In the context of AWS EC2, the cloud API call 221 may represent a describeVolumes request. In one example, the VM database daemon 222 is implemented in the form of a Simple Management Framework (SMF) application.

The storage device information table 224 may represent a datastore in which the VM database daemon 222 stores for each storage device attached to the VM, a volume identifier (ID), a volume type, and a backing storage device type. The volume ID may represent a unique identifier, such as a serial number or a vendor unique identifier assigned to a given storage device by the cloud environment. The volume type may be a text string representing an enumerated value based on the various types of storage devices supported by the cloud environment. The backing storage device type may be a text string representing an enumerated value based on the various types of storage devices supported by the virtual storage system 210 that is derived from the volume type via a cloud environment specific mapping. In the context of AWS, non-limiting examples of volume type include AWS EBS gp2, gp3, io1, io2, st1 and sc1, which may be mapped to corresponding backing storage device types of equal or lesser granularity supported by the virtual storage system 210. For example, gp2, gp3, io1, and io2 may be mapped to a backing storage device type of SSD and st1 and sc1 may be mapped to a backing storage device type of HDD. Depending on the particular implementation, various other categorizations or groupings of backing storage types may be employed, for example, including more granular performant disk categories of backing storage based on different performance characteristics (e.g., one or more of durability, input/output operations per second (IOPS), and/or throughput) of the backing storage.

In one embodiment, the kernel space 230 includes a VM database kernel module 232 and a storage device driver 236. The VM database kernel module 232 may be responsible for maintaining a local kernel cache (e.g., cache 234) containing a local copy of the storage device information table, including updating the local kernel cache responsive to a system call (e.g., input/output control (ioctl) 233) triggered by the VM database daemon and making an upcall 231 to the VM database daemon 222 responsive to a cache miss. While for simplicity, the storage device driver 236 is shown as a single component, it may represent a physical host adapter (PHA) with components distributed across the storage operating system and the guest operating system. The portion of the PHA running in the guest operating system may be notified when new volumes are attached to the VM. The portion of the PHA running in the guest operating system may in turn notify the portion of the PHA running within the storage operating system, which may be listening for new storage device attach events. The storage device driver 236 may persist and retrieve information within header regions (e.g., header regions 243 and 244) of storage devices (e.g., HDD 242 and SSD 244) via an appropriate storage protocol 237 (e.g., Non-Volatile Memory Express (NVMe) protocol, SCSI, iSCSI, and the like). As described further below, the header regions may be reserved for use by the virtual storage system 210. For example, the backing storage device type may be written to the header region (e.g., the first 4 KB block) of a given storage device during a storage device add event. Once written, for any subsequent boots of the virtual storage system 210, the backing storage device type for a given storage device may be read from its header region, thereby allowing the backing storage device type to be persisted across reboots.

In one embodiment, the VM database kernel module 232 provides an interface through which various actions may be performed with respect to the local kernel cache. For example, a match function may be provided for comparing a specified backing storage device type for a specified volume ID to that which is stored in the local kernel cache. The match function may return a Boolean value of true when the specified backing storage device type matches that which is stored in the local kernel cache for the specified volume ID. Similarly or alternatively, a function may be provided that returns the backing storage device type for a specified volume ID. When no entry is found within the local kernel cache for the specified volume ID (a cache miss), the VM database kernel module 232 may perform a blocking upcall (e.g., upcall 231) to request the backing storage device type from the user space process in which the VM database kernel module 232 listens and waits for a corresponding system call (e.g., ioctl 233) responsive to the upcall.

Example User Space Boot Phase

Figure 3:
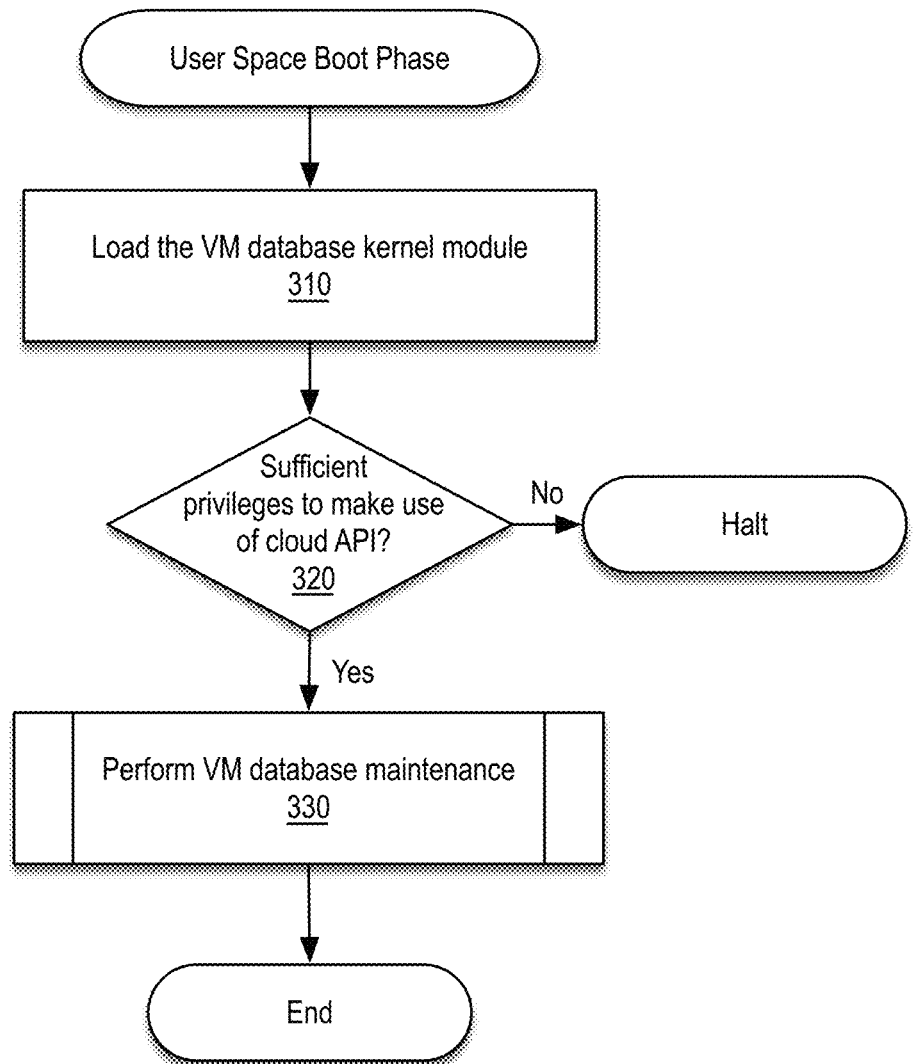
FIG. 3 is a flow diagram illustrating operations for performing a user space boot phase in accordance with an embodiment of the present disclosure.

FIG. 3 is a flow diagram illustrating operations for performing a user space boot phase in accordance with an embodiment of the present disclosure. The user space boot phase described with reference to FIG. 3 represents a non-limiting example of boot processing that may be performed by a user space process (e.g., VM database daemon 222), for example, responsive to a virtual storage system (e.g., one of virtual storage systems 110a-c) being booted within a VM hosted within a cloud environment (e.g., hyperscaler 120).

At block 310, a VM database kernel module (e.g., VM database kernel module 232) may be loaded by the user space process.

At decision block 320, a determination is made regarding whether the VM within which the user space process is running has sufficient privileges to make use of the cloud API (e.g., API 123). If so, processing continues with block 330; otherwise, the VM is halted. In the context of AWS, this determination may involve testing permissions with the use of a dry run option of a particular API call of the cloud API. For example, by issuing the particular call with the dry run option set to true, the user space process may check whether the VM has been assigned the correct Identity and Access Management (IAM) role to permit use of the particular API call without actually making the request.

At block 330, VM database maintenance may be performed, for example, to gather information regarding storage devices attached to the VM and make such information available to facilitate registration of the attached storage devices with the virtual storage system. A non-limiting example, of VM database maintenance processing is described further below with reference to FIG. 4.

While in the context of the present example, a number of enumerated blocks are included, it is to be understood that examples may include additional blocks before, after, and/or in between the enumerated blocks. Similarly, in some examples, one or more of the enumerated blocks may be omitted and/or performed in a different order.

While in the context of the present example, a user space process is described as the interface to the cloud API, it is to be appreciated in other examples, it may be a kernel space process.

Example VM Database Maintenance Processing

Figure 4:
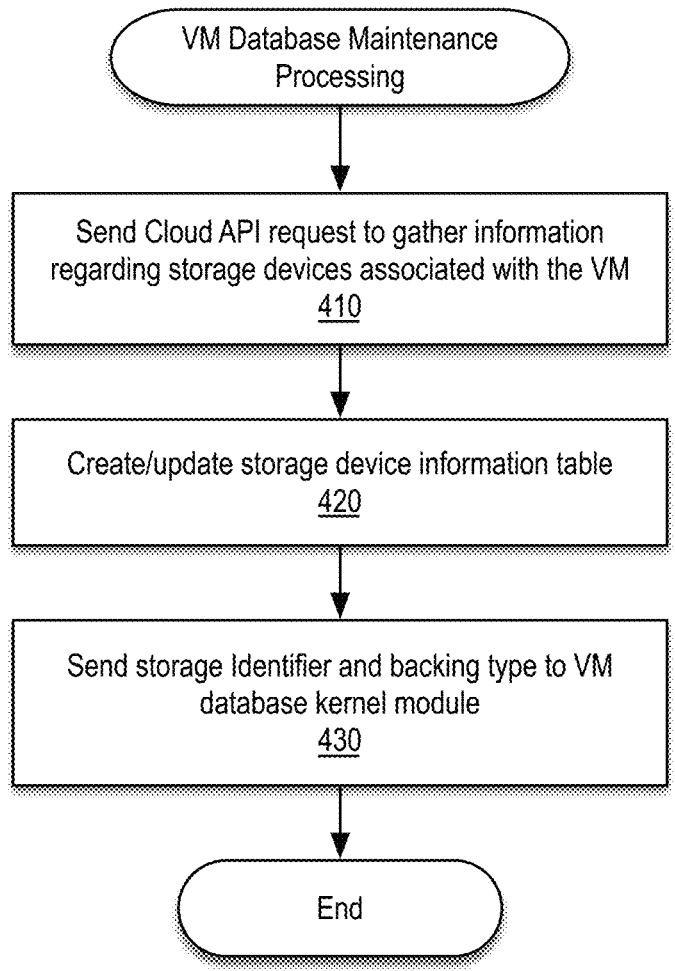
FIG. 4 is a flow diagram illustrating operations for performing virtual machine (VM) database maintenance processing in accordance with an embodiment of the present disclosure.

FIG. 4 is a flow diagram illustrating operations for performing virtual machine (VM) database maintenance processing in accordance with an embodiment of the present disclosure. The VM database maintenance processing described with reference to FIG. 4 may be performed by a user space process (e.g., VM database daemon 222) running within the user space (e.g., user space 220) of a virtual storage system (e.g., one of virtual storage systems 110a-c) hosted within a cloud environment (e.g., hyperscaler 120).

At block 410, a cloud API request (e.g., cloud API call 21) may be sent to gather information from the cloud environment regarding storage devices attached to the VM in which the user space process is running During initial boot processing, the user space process may make the cloud API request for all storage devices attached to the VM, whereas responsive to an upcall (e.g., upcall 231) triggered by a kernel process (e.g., storage device driver 236), the user space process may specify a specific volume ID (e.g., of a volume newly attached to the VM and for which information is not present in a kernel cache (e.g., cache 234).

At block 420, responsive to receipt of the response to the cloud API request made in block 410, a storage device information table (e.g., storage device information table 224) is updated. According to one embodiment, a cloud environment specific mapping table may be used to translate volume types of a set of volume types (e.g., AWS EC2 gp2, gp3, io1, io2, st1, and sc1) supported by the cloud environment and returned by the cloud API response to a set of backend storage device types (e.g., SSD and HDD) supported by the virtual storage system, for example, to facilitate performance of data tiering with a hybrid aggregate including storage devices of different performant types. In this particular example, AWS EC2 gp2, gp3, io1, and io2 would be mapped to SSD and st1 and sc1 would be mapped to HDD.

At block 430, the kernel cache is also updated by sending the storage device identifier(s) (e.g., volume IDs) and corresponding volume type(s) and backing storage device type(s). In one embodiment, extraneous information (e.g., number of permissible IOPS configured for the storage device) obtained at block 420 may be excluded from the kernel cache. In one embodiment, the kernel cache may be updated via a system call (e.g., ioctl 233) handled by a kernel module (e.g., VM database kernel module 232) that manages access to the kernel cache. In an alternative embodiment, the user space process or the virtual storage system may subscribe to be notified by the cloud environment regarding storage device events for storage devices attached to the VM. Such a subscription approach at the user space level, would allow the user space process to take an action when a storage device event (e.g., an AWS EC2 disk add event) is registered, and update the kernel cache. In this manner, the kernel cache would be kept up to date without the need for upcalls (e.g., upcall 231) to the user space 220.

While in the context of the present example, a number of enumerated blocks are included, it is to be understood that examples may include additional blocks before, after, and/or in between the enumerated blocks. Similarly, in some examples, one or more of the enumerated blocks may be omitted and/or performed in a different order.

Example Storage Device Add Processing

Figure 5:
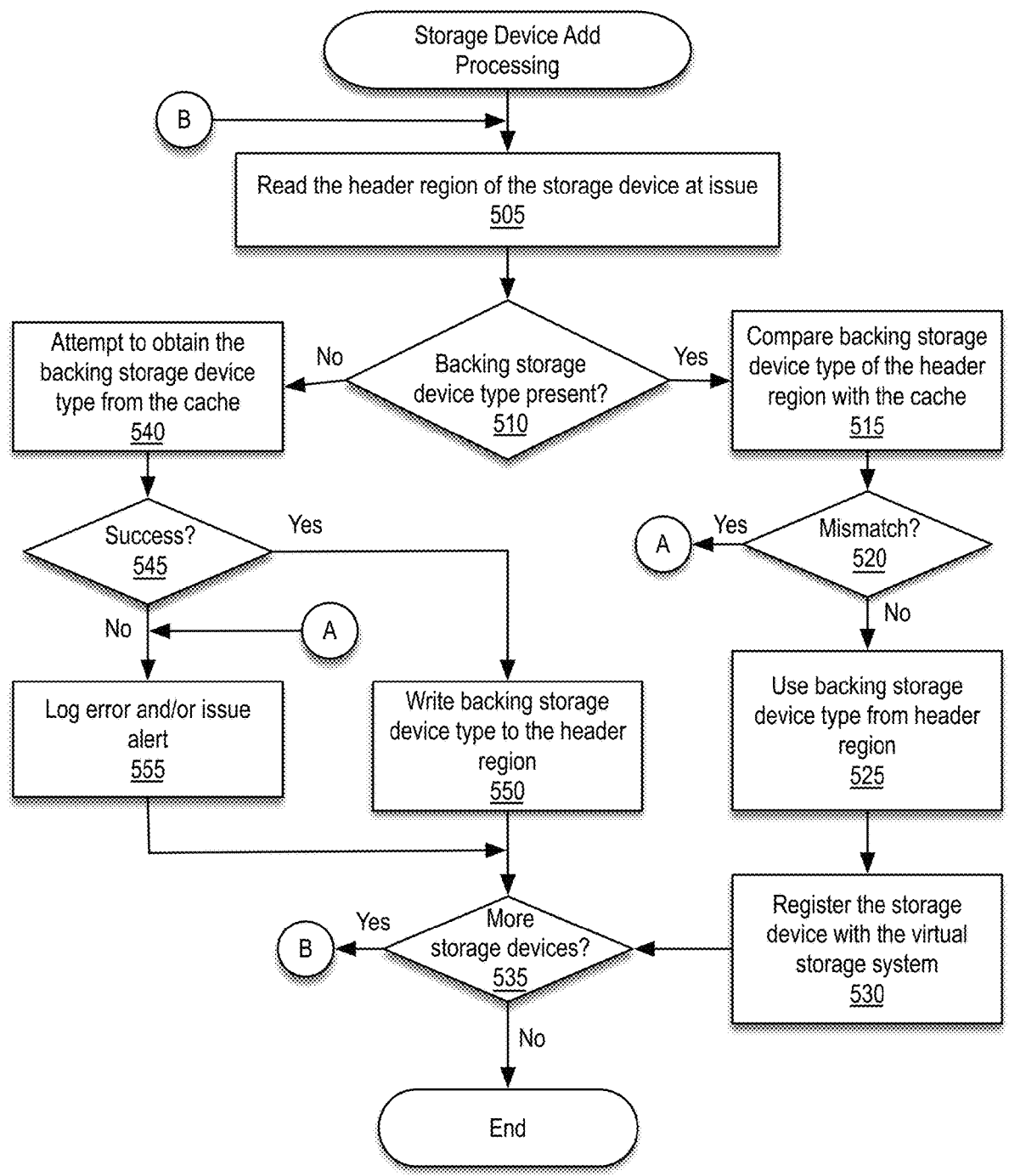
FIG. 5 is a flow diagram illustrating operations for performing storage device add processing in accordance with an embodiment of the present disclosure.

FIG. 5 is a flow diagram illustrating operations for performing storage device add processing in accordance with an embodiment of the present disclosure. The storage device add processing described with reference to FIG. 5 may be performed by a kernel process (e.g., storage device driver 236) during initial boot processing, reboot processing, or responsive to the addition of a new storage device being attached to the VM in which the virtual storage system (e.g., one of virtual storage systems 110a-c) is running. For example, during initial boot processing and reboot processing, the storage device add processing may be performed for a list of multiple storage devices that are attached to the VM, for example, identified by the respective volume IDs, whereas responsive to the addition of a new storage device, the list may include only one volume ID corresponding to the newly attached storage device.

At block 505, the kernel process reads a header region (e.g., header region 243 or 245) of the storage device at issue. As noted above, the header region may represent a first block of a given storage device that is reserved for use by the virtual storage system. Storage of information to the header region facilitates persisting of such information across boots of the virtual storage system. In particular, the kernel process may read the backing storage device type for the storage device at issue. Depending upon the particular implementation, the header region may also include pertinent storage device-specific information (e.g., IOPS).

At decision block 510, a determination is made regarding whether the type of backing storage is present within the header region. If so, processing continues with block 515; otherwise, processing branches to block 540. In the context of the present example, the "yes" path to block 515 is indicative of the storage device being re-added during a reboot as the header region has previously been initialized. Similarly, the "no" path to block 540 is indicative of the storage device being newly added or attached to the VM in which the header region is uninitialized or a system upgrade in which the format of the header region has been modified.

At block 515, the backing storage device type read from the header region is compared with the corresponding entry in a local kernel cache (e.g., cache 234). For example, a call may be made to a kernel module (e.g., VM database kernel module 232 that manages access to the local kernel cache specifying the volume ID and the backing storage device type and the kernel module may return a Boolean value indicating whether the supplied backing storage device type matches the backing storage device type cached for the supplied volume ID.

At decision block 520, a determination is made regarding whether there is a mismatch between the backing storage type of the header region and that stored in the local kernel cache. If so, processing branches to block 555; otherwise, processing continues with block 525. In the context of the present example, changing a backing storage device type on an attached storage device is not a supported action and represents an error. A mismatch is potentially indicative of a user of the virtual storage system or a user of the cloud environment having used a cloud API (e.g., API 123) to change the volume type of the storage device (and as a result the corresponding backing storage device type) after it has been persisted to the header region of the storage device. Alternatively, the mismatch may be indicative of corruption of the backing storage device type within the header region.

At block 525, as the cached backing storage device type for the storage device matches the backing storage device type read from the header region, it is permissible to continue the storage device add processing with the backing storage device type.

At block 530, the storage device is registered with the virtual storage system for use as a data storage media.

At decision block 535, it is determined whether there is another storage device to be added to the virtual storage system. If so, processing loops back to block 505; otherwise storage device add processing is complete.

At block 540, it was previously determined the backing storage device type was not present within the header region of the storage device at issue. As such, an attempt is made to obtain the backing storage device type from the local kernel cache. In one embodiment, the kernel module may provide an interface through which block 540, At decision block 545, it is determined whether the attempt to obtain the backing storage device type made in block 540 was successful. If so, processing continues to block 550; otherwise processing branches to block 555.

At block 550, responsive to successfully obtaining the backing storage device type for the storage device at issue, the backing storage type may be written to the header region of the storage device at issue.

At block 555, a storage device add failure may be logged and/or an alert may be issued to an administrative user of the virtual storage system, for example, in the form of a console message.

Assuming multiple different types of backing storage device types are among those attached to the VM, after the boot phase has been completed, a hybrid aggregate may be created by the virtual storage system including at least one storage device of a first performant type of storage devices (e.g., HDD) for inclusion within a capacity tier of the hybrid aggregate and to which cold data may be migrated during data tiering and at least one storage device of a second performant type of storage devices (e.g., SSD) for inclusion within a performance tier of the hybrid aggregate and to which hot data may be migrated during data tiering. In this manner, the detection and persisting of backing storage device types of storage devices attached to a VM across reboots of the virtual storage system facilitates performance of data tiering.

While in the context of the present example, a number of enumerated blocks are included, it is to be understood that examples may include additional blocks before, after, and/or in between the enumerated blocks. Similarly, in some examples, one or more of the enumerated blocks may be omitted and/or performed in a different order.

While in the context of the various examples, the process of gathering information regarding storage devices (a non-limiting example of which is represented by FIG. 4) may be described as a serial/synchronous process, it is to be noted this storage device discovery process may be implemented as a parallel/asynchronous process and may be performed periodically in the background and/or responsive to a triggering event (e.g., a notification by the operating system regarding a new storage device that has been attached to the VM) to keep the local kernel cache updated. For example, the triggering event may represent a new storage device being attached to the VM after the boot phase has been completed while the virtual storage system is up and healthy (which may be referred to as a "hot volume attach").

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 6:
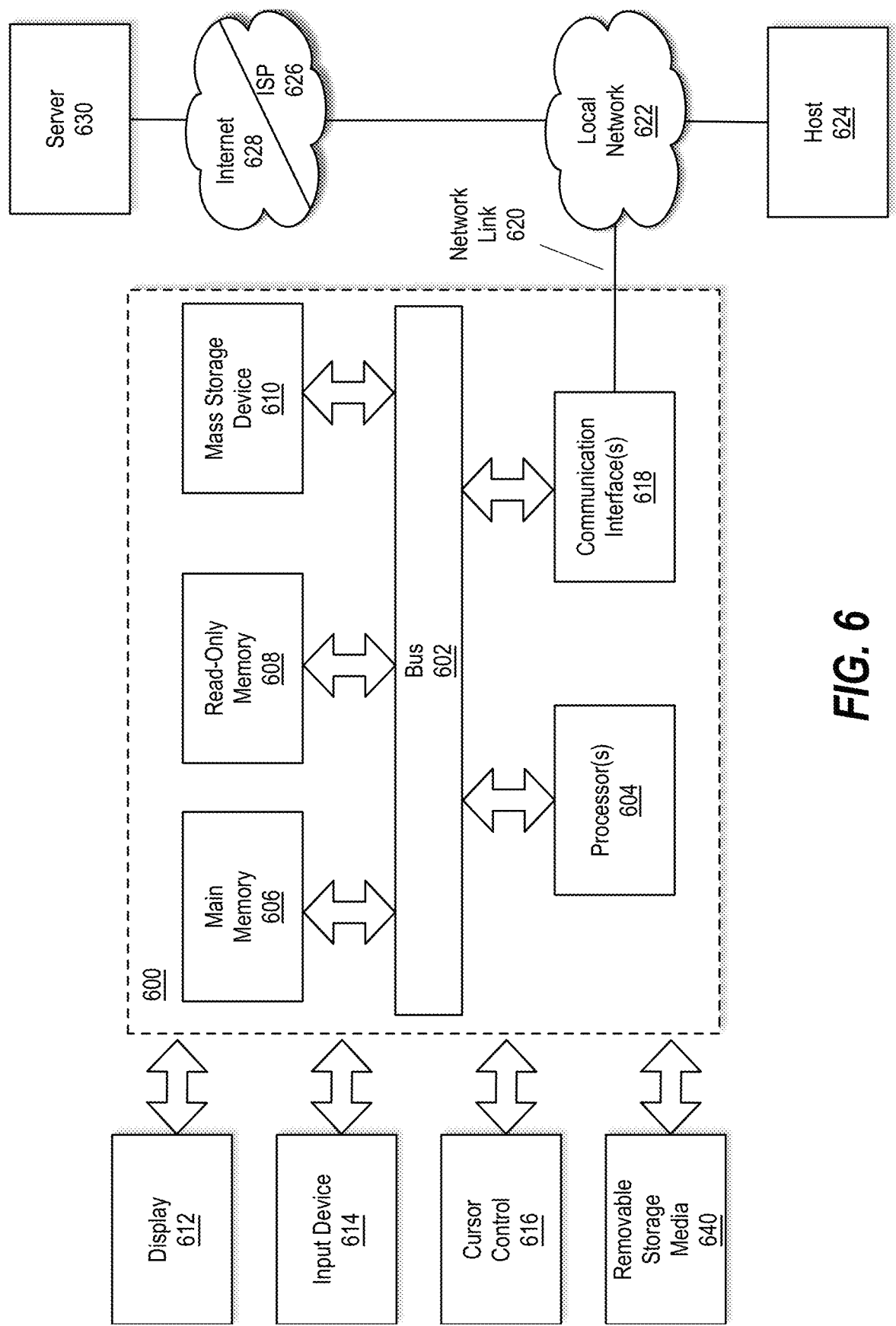
FIG. 6 illustrates an example computer system in which or with which embodiments of the present disclosure may be utilized.

FIG. 6 is a block diagram that illustrates a computer system 600 in which or with which an embodiment of the present disclosure may be implemented. Computer system 600 may be representative of all or a portion of the computing resources of a physical host on which a virtual storage system (e.g., one of virtual storage systems 110a-c) of a distributed storage system is deployed. Notably, components of computer system 600 described herein are meant only to exemplify various possibilities. In no way should example computer system 600 limit the scope of the present disclosure. In the context of the present example, computer system 600 includes a bus 602 or other communication mechanism for communicating information, and a processing resource (e.g., a hardware processor 604) coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, e.g., a magnetic disk, optical disk or flash disk (made of flash memory chips), is provided and coupled to bus 602 for storing information and instructions.

Computer system 600 may be coupled via bus 602 to a display 612, e.g., a cathode ray tube (CRT), Liquid Crystal Display (LCD), Organic Light-Emitting Diode Display (OLED), Digital Light Processing Display (DLP) or the like, for displaying information to a computer user. An input device 614, including alphanumeric and other keys, is coupled to bus 602 for communicating information and command selections to processor 604. Another type of user input device is cursor control 616, such as a mouse, a trackball, a trackpad, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Removable storage media 640 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 600 may implement the techniques described herein using customized hard-wired logic, one or more ASICs or FPGAs, firmware or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 610. Volatile media includes dynamic memory, such as main memory 606. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, or stored in storage device 610, or other non-volatile storage for later execution.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A virtual storage system comprising:
a processing resource; and
a non-transitory computer-readable medium, coupled to the processing resource, having stored therein instructions that when executed by the processing resource cause the virtual storage system to:

during a boot phase of the virtual storage system that is within a compute instance of a cloud environment, obtain, by a first process of the virtual storage system via an application programming interface (API) exposed by the cloud environment, information indicative of a type of backing storage for respective storage devices of a plurality of storage devices associated with the compute instance;

cause, by the first process, the obtained information to be stored within a cache accessible to a second process of the virtual storage system that is separate from the first process;

facilitate, by the second process, use of at least a subset of the plurality of storage devices in data tiering by the virtual storage system, by, for each storage device of the plurality of storage devices:

determining whether a header region, on the storage device, reserved for use by the virtual storage system contains information indicative of the type of backing storage for the storage device; and responsive to a negative determination of the header region containing the information indicative of the type of backing storage for the storage device:

initializing, based on the obtained information in the cache, information indicative of the type of backing storage for the storage device within the header region; and registering the storage device with the virtual storage system.

2. The virtual storage system of claim 1, wherein the first process comprises a user space process and the second process comprises a kernel space process and wherein the plurality of storage devices comprise disks.

3. The virtual storage system of claim 2, wherein the instructions further cause the virtual storage system to:

responsive to addition of a new disk to the compute instance after the boot phase has been completed, obtain, by the user space process via the API, information indicative of the type of backing storage for the new disk; and cause, by the user space process, the obtained information indicative of the type of backing storage for the new disk to be stored within the cache.

4. The virtual storage system of claim 1, wherein facilitate, by the second process, use of at least a subset of the plurality of storage devices in data tiering by the virtual storage system further comprises, for each storage device of the plurality of storage devices, responsive to an affirmative determination of the header region containing the information indicative of the type of backing storage for the storage device:

performing a comparison between the obtained information stored within the cache and the information indicative of the type of backing storage for the storage device contained within the header region; and responsive to the comparison identifying a mismatch:
precluding registration of the storage device with the virtual storage system; and
alerting an administrative user of the virtual storage system regarding the mismatch.

5. The virtual storage system of claim 1, wherein the information indicative of the type of backing storage for the respective storage devices of the plurality of storage devices comprises a disk type of a plurality of disk types, available within the cloud environment, that differ in granularity from a plurality of types of backing disks employed for data tiering by the virtual storage system.

6. The virtual storage system of claim 5, wherein the plurality of types of backing disks represent backing disks having different performance characteristics.

7. The virtual storage system of claim 6, wherein the plurality of types of backing disks include hard-disk drive (HDD) and solid-state drive (SSD), and wherein the method further comprises translating the disk type to a corresponding type of backing disk of the plurality of types of backing disks.

8. The virtual storage system of claim 1, wherein the compute instance comprises a virtual machine or a container.

9. A method comprising:

during a boot phase of a virtual storage system that is within a compute instance of a cloud environment, obtaining, by a first process of the virtual storage system via an application programming interface (API) exposed by the cloud environment, information indicative of a type of backing storage for respective storage devices of a plurality of storage devices associated with the compute instance;

causing, by the first process, the obtained information to be stored within a cache accessible to a second process of the virtual storage system that is separate from the first process;

facilitating, by the second process, use of at least a subset of the plurality of storage devices in data tiering by the virtual storage system, by, for each storage device of the plurality of storage devices:

determining whether a header region, on the storage device, reserved for use by the virtual storage system contains information indicative of the type of backing storage for the storage device; and responsive to a negative determination of the header region containing the information indicative of the type of backing storage for the storage device:

initializing, based on the obtained information in the cache, information indicative of the type of backing storage for the storage device within the header region; and registering the storage device with the virtual storage system.

10. The method of claim 9, wherein the first process comprises a user space process and the second process comprises a kernel space process and wherein the plurality of storage devices comprise disks.

11. The method of claim 10, further comprising:

responsive to addition of a new disk to the compute instance after the boot phase has been completed, obtaining, by the user space process via the API, information indicative of the type of backing storage for the new disk; and causing, by the user space process, the obtained information indicative of the type of backing storage for the new disk to be stored within the cache.

12. The method of claim 9, wherein said facilitating, by the second process, use of at least a subset of the plurality of storage devices in data tiering by the virtual storage system further comprises, for each storage device of the plurality of storage devices, responsive to an affirmative determination of the header region containing the information indicative of the type of backing storage for the storage device:

performing a comparison between the obtained information stored within the cache and the information indicative of the type of backing storage for the storage device contained within the header region; and responsive to the comparison identifying a mismatch:
precluding registration of the storage device with the virtual storage system; and
alerting an administrative user of the virtual storage system regarding the mismatch.

13. The method of claim 9, wherein the information indicative of the type of backing storage for the respective storage devices of the plurality of storage devices comprises a disk type of a plurality of disk types, available within the cloud environment, that differ in granularity from a plurality of types of backing disks employed for data tiering by the virtual storage system and wherein the plurality of types of backing disks represent backing disks having different performance characteristics.

14. The method of claim 13, wherein the plurality of types of backing disks include hard-disk drive (HDD) and solid-state drive (SSD), and wherein the method further comprises translating the disk type to a corresponding type of backing disk of the plurality of types of backing disks.

15. A non-transitory machine readable medium storing instructions, which when executed by a processing resource of a virtual storage system deployed within a compute instance of a cloud environment, cause the virtual storage system to:
during a boot phase of the virtual storage system that is within a compute instance of a cloud environment, obtain, by a first process of the virtual storage system via an application programming interface (API) exposed by the cloud environment, information indicative of a type of backing storage for respective storage devices of a plurality of storage devices associated with the compute instance;
cause, by the first process, the obtained information to be stored within a cache accessible to a second process of the virtual storage system that is separate from the first process;
facilitate, by the second process, use of at least a subset of the plurality of storage devices in data tiering by the virtual storage system, by, for each storage device of the plurality of storage devices:
determining whether a header region, on the storage device, reserved for use by the virtual storage system contains information indicative of the type of backing storage for the storage device; and
responsive to a negative determination of the header region containing the information indicative of the type of backing storage for the storage device:
initializing, based on the obtained information in the cache, information indicative of the type of backing storage for the storage device within the header region based; and
registering the storage device with the virtual storage system.

16. The non-transitory machine readable medium of claim 15, wherein the first process comprises a user space process and the second process comprises a kernel space process and wherein the plurality of storage devices comprise disks.

17. The non-transitory machine readable medium of claim 16, wherein the instructions further cause the virtual storage system to:
responsive to addition of a new disk to the compute instance after the boot phase has been completed, obtain, by the user space process via the API, information indicative of the type of backing storage for the new disk; and
cause, by the user space process, the obtained information indicative of the type of backing storage for the new disk to be stored within the cache.

18. The non-transitory machine readable medium of claim 15, wherein facilitate, by the second process, use of at least a subset of the plurality of storage devices in data tiering by the virtual storage system further comprises, for each storage device of the plurality of storage devices, responsive to an affirmative determination of the header region containing the information indicative of the type of backing storage for the storage device:
performing a comparison between the obtained information stored within the cache and the information indicative of the type of backing storage for the storage device contained within the header region; and
responsive to the comparison identifying a mismatch:
precluding registration of the storage device with the virtual storage system; and
alerting an administrative user of the virtual storage system regarding the mismatch.

19. The non-transitory machine readable medium of claim 15, wherein the information indicative of the type of backing storage for the respective storage devices of the plurality of storage devices comprises a disk type of a plurality of disk types, available within the cloud environment, that differ in granularity from a plurality of types of backing disks employed for data tiering by the virtual storage system.

20. The non-transitory machine readable medium of claim 19, wherein the plurality of types of backing disks represent backing disks having different performance characteristics and wherein the plurality of types of backing disks include hard-disk drive (HDD) and solid-state drive (SSD), and wherein the method further comprises translating the disk type to a corresponding type of backing disk of the plurality of types of backing disks.

* * * * *

UNITED STATES PATENT AND TRADEMARK OFFICE
CERTIFICATE OF CORRECTION

| | | |
|---|---|---|
| PATENT NO. | : 11,842,084 B2 | Page 1 of 1 |
| APPLICATION NO. | : 17/729891 | |
| DATED | : December 12, 2023 | |
| INVENTOR(S) | : Pawar et al. | |

It is certified that error appears in the above-identified patent and that said Letters Patent is hereby corrected as shown below:

In the Claims

Column 17, Line 49 should be changed from "header region based; and" to --header region; and--.

Signed and Sealed this
Second Day of July, 2024

*Katherine Kelly Vidal*

Katherine Kelly Vidal
*Director of the United States Patent and Trademark Office*